United States Patent
Masumoto

(10) Patent No.: US 9,892,566 B2
(45) Date of Patent: Feb. 13, 2018

(54) IMAGE PROCESSING APPARATUS, METHOD AND PROGRAM

(75) Inventor: Jun Masumoto, Minato-ku (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 470 days.

(21) Appl. No.: 13/367,040

(22) Filed: Feb. 6, 2012

(65) Prior Publication Data
US 2012/0200560 A1    Aug. 9, 2012

(30) Foreign Application Priority Data
Feb. 7, 2011    (JP) .................................. 2011-023810

(51) Int. Cl.
G06T 19/20        (2011.01)
G06F 3/0482       (2013.01)

(52) U.S. Cl.
CPC ............ *G06T 19/20* (2013.01); *G06F 3/0482* (2013.01); *G06T 2210/41* (2013.01)

(58) Field of Classification Search
CPC ......... G06T 19/00; G06T 17/20; G06T 17/00; G06T 15/10; G06T 11/60; G06T 7/0067; G06T 2200/32; A63F 2300/69
See application file for complete search history.

(56) References Cited

U.S. PATENT DOCUMENTS

| | | | |
|---|---|---|---|
| 5,940,527 A | 8/1999 | Takeo | |
| 6,429,884 B1 | 8/2002 | Budz et al. | |
| 6,469,709 B1 * | 10/2002 | Sakai | G06T 3/00 345/619 |

(Continued)

FOREIGN PATENT DOCUMENTS

| | | |
|---|---|---|
| CN | 1806260 A | 7/2006 |
| JP | 3-251971 A | 11/1991 |

(Continued)

OTHER PUBLICATIONS

Mei Xiao, Jung Soh, Oscar Meruvia-Pastor, Eric Schmidt, Benedikt Hallgrímsson, Christoph W Sensen,"Building generic anatomical models using virtual model cutting and iterative registration", BMC Medical Imaging,vol. 10, Feb. 8, 2010, http://www.biomedcentral.com/1471-2342/10/5.*

(Continued)

*Primary Examiner* — Sarah Le
(74) *Attorney, Agent, or Firm* — Sughrue Mion, PLLC

(57) ABSTRACT

A three-dimensional medical image is obtained, and displayed on a display screen. An input position by a user on the display screen and an input operation by the user are received. If the received input position is located in a center region of the display screen, rotation processing is performed on the three-dimensional medical image based on the received input operation. If the received input position is located in a region other than the center region, region specification processing is performed on the displayed three-dimensional medical image based on the received input operation. The region specification processing specifies a closed curve on the display screen based on the received input operation, and deletes a part of the three-dimensional medical image, and the part being an inside or an outside of a cylinder extending from the specified closed curve toward the depth direction of the display screen.

17 Claims, 6 Drawing Sheets

(56) References Cited

U.S. PATENT DOCUMENTS

| | | | |
|---|---|---|---|
| 7,706,681 B2* | 4/2010 | Misawa | 396/374 |
| 2002/0181754 A1 | 12/2002 | Masumoto et al. | |
| 2003/0095692 A1 | 5/2003 | Mundy et al. | |
| 2005/0010100 A1 | 1/2005 | Hornegger et al. | |
| 2006/0197780 A1 | 9/2006 | Watkins et al. | |
| 2006/0285734 A1 | 12/2006 | Haider et al. | |
| 2006/0294061 A1 | 12/2006 | Deischinger | |
| 2007/0206030 A1 | 9/2007 | Lukis | |
| 2007/0277111 A1* | 11/2007 | Bennett | G06F 3/04812 715/763 |
| 2008/0084430 A1* | 4/2008 | Sakakura | G06T 3/60 345/649 |
| 2009/0022427 A1* | 1/2009 | Park et al. | 382/298 |
| 2010/0201683 A1* | 8/2010 | Shirahata et al. | 345/420 |

FOREIGN PATENT DOCUMENTS

| | | | |
|---|---|---|---|
| JP | 08-215183 A | | 8/1996 |
| JP | 2000066800 A | | 3/2000 |
| JP | 2000210261 A | | 8/2000 |
| JP | 2001-137230 A | | 5/2001 |
| JP | 2001-283191 A | | 10/2001 |
| JP | 2003-271924 A | | 9/2003 |
| JP | 2004-141612 A | | 5/2004 |
| JP | 2005-296156 A | | 10/2005 |
| JP | 2005296156 | * | 10/2005 |
| JP | 2006341092 A | | 12/2006 |
| JP | 2007135843 A | | 6/2007 |
| JP | 2008-043564 A | | 2/2008 |
| JP | 2008125881 | * | 6/2008 |
| JP | 2008125881 A | | 6/2008 |
| JP | 2008-253293 A | | 10/2008 |

OTHER PUBLICATIONS

McCausland, Tutorial for MRIcro medical image freeware, MRIcro tutorial, Feb. 1, 2001, http://www.mccauslandcenter.sc.edu/mricro/mricro/mritut.html.*

TeachSmith, "Welcome to SnagIt Editor", Jun. 13, 2008, http://download.techsmith.com/snagit/docs/onlinehelp/enu/9/default.htm?turl=welcometosnagiteditor.html.*

H. Fujita et al., "Intelligent Computer-Aided Diagnosis Based on Normal Structure Recognition of Human Body", Grant-in-Aid for Scientific Research, granted by the Ministry of Education, Culture Sports, Science and Technology (MEXT), Study in Specific Field "Intellectual Diagnosis Aid of Multi-Dimensional Medical Image" Proceedings of the 4th Symposium 2007 pp. 55-60.

K. Kubota et al., "Evaluation of Computer-Aided Diagnosis System for Lung Cancer Based on Helical CT Images", the Institute of Electronics, Information and Communication Engineers (IEICE), IEICE Technical Report, 2001, pp. 41-46, vol. 101, No. 310.

S. Kido et al., "Intelligent CAD for Diffuse Lung Diseases", Grant-in-Aid for Scientific Research, granted by the Ministry of Education, Culture, Sports, Science and Technology (MEXT), Study in Specific Field "Intellectual Diagnosis Aid of Multi-Dimensional Medical Image", Proceedings of the 4th Symposium, 2007 pp. 45-54.

Y. Wakida et al., "Liver Cancer Detection Based on a Temporal Density Feature from Abdominal Dynamic X-ray CT Images", Journal of Computer Aided Diagnosis of Medical Images, 2007, pp. 1-10, vol. 10, No. 1.

Japanese Office Action; Application No. 2011-023810; dated Feb. 5, 2013.

Japanese Office Action; Application No. 2011-023810; dated Apr. 23, 2013.

Japanese Office Action issued Jul. 16, 2013 in corresponding Japanese Patent Application No. 2011-023810, 3 pages in Japanese and English.

Communication dated May 13, 2014, issued by the Japanese Patent Office, in counterpart Application No. 2013-191405.

Y. Suto et al. "System for Simulated Surgery based on Three-Dimensional Image Processing", 1990, vol. 45, No. 8.

Communication dated Dec. 4, 2015 from the State Intellectual Property Office of the P.R.C. in counterpart application No. 201210026189.2.

Cui et al., "Research of silhouette in pen-based 3D sketch rendering," Application Research of Computers vol. 24, No. 12, Dec. 2007 (4 pages total).

Communication dated Aug. 18, 2016, issued by the State Intellectual Property Office of the P.R.C. in corresponding Chinese Application No. 201210026189.2.

Chinese Office Action issue Feb. 3, 2017 in corresponding Chinese Application No. 201210026189.2.

Communication dated Jul. 4, 2017 from the European Patent Office in counterpart Application No. 12153578.5.

* cited by examiner

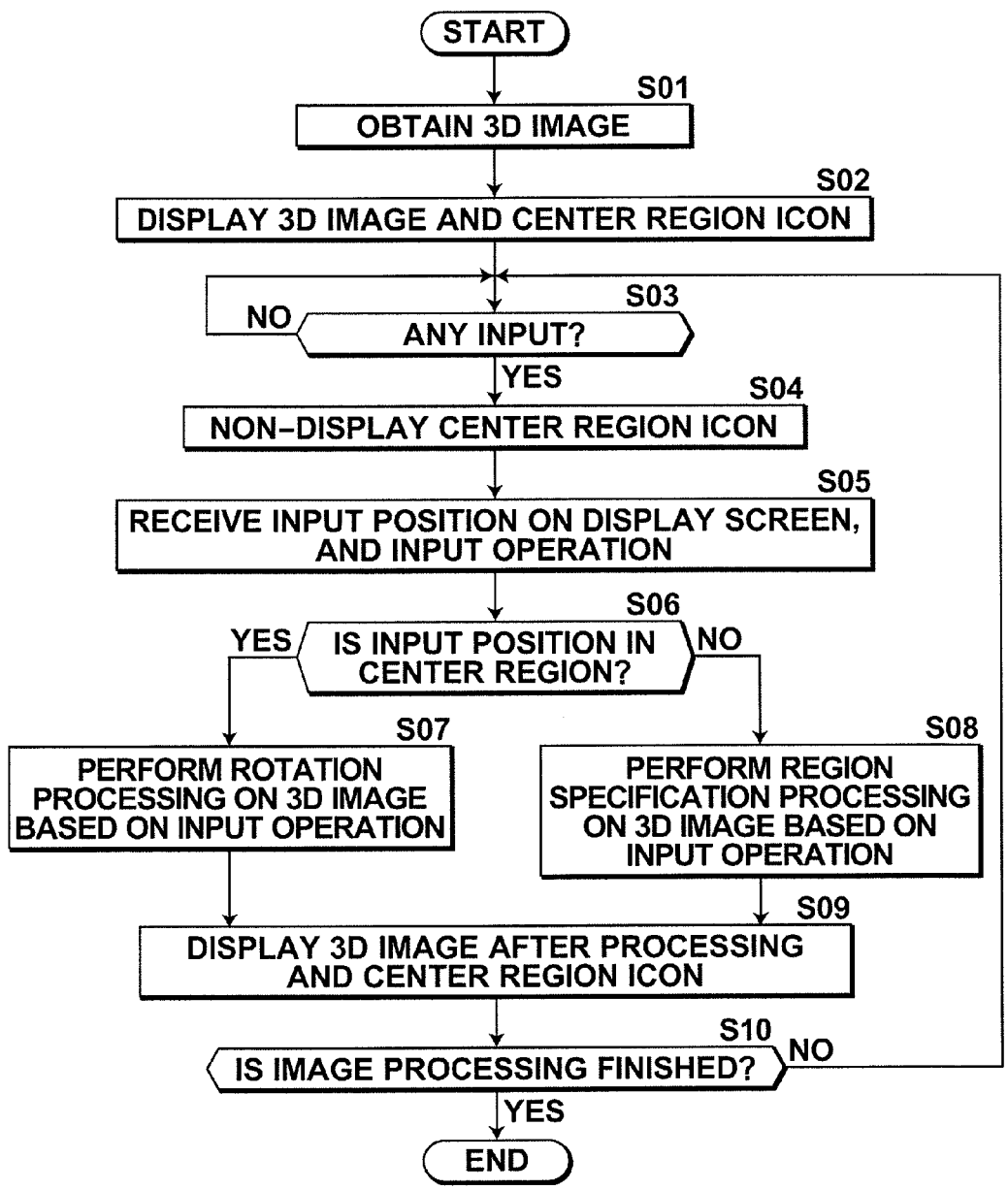

IMAGE PROCESSING APPARATUS, METHOD AND PROGRAM

BACKGROUND OF THE INVENTION

Field of the Invention

The present invention relates to image processing techniques for performing rotation processing and region specification processing on a three-dimensional medical image in such a manner that the two kinds of processing are switched with each other. Particularly, the present invention relates to an image processing technique for repeating rotation of a displayed three-dimensional medical image and deletion of an unneeded part of the three-dimensional medical image, and which is appropriate for extracting only a desired organ from the three-dimensional medical image.

Description of the Related Art

In recent years, an advance of image processing techniques made it possible to generate projection images by projecting a three-dimensional medical image from various angles by using various image generation methods, such as volume rendering and surface rendering. The generated projection images are displayed on a display screen, as a moved image, an enlarged image, a rotated image or the like of the three-dimensional medical image, by a user's operation of a mouse or the like on the display screen. Such images can aid three-dimensional recognition and understanding of the three-dimensional medical image.

Conventionally, rotation of a three-dimensional medical image to various directions and deletion of an unneeded region in the three-dimensional medical image by specifying the unneeded region are repeated in general by a manual operation of a mouse or a keyboard by a user who is a radiographer or the like. The processing is repeated may times to extract, based on the purpose of diagnosis, a desired region from the three-dimensional medical image. The processing is repeated until only the desired region is included in the three-dimensional medical image, and the extracted region is displayed. Therefore, there is a demand for simplifying, as much as possible, the manual operation by the user to perform rotation of a three-dimensional image to various direction and deletion of an unneeded region in the three-dimensional medical image.

For example, a method for switching region specification processing and rotation processing with each other has been proposed. In the method, the region specification processing is assigned to a drag operation by the left button of a mouse, and the rotation processing is assigned to a drag operation by the left button of the mouse with a shift button on a keyboard pressed. In this method, switching of processing is simplified by combining the single operation, i.e., the drag operation by the left button of the mouse, with presence or non-presence of an operation of pressing a shift key on a keyboard.

Further, Japanese Unexamined Patent Publication No. 2005-296156 (Patent Document 1) discloses an image processing method in which different kinds of processing function are assigned to plural regions a, b, c . . . , respectively. The plural regions a, b, c . . . are obtained by dividing, in a predetermined division pattern, a display screen for displaying an image obtained by imaging. In the method, specification of a desired region by a pointing device is received, and a processing function assigned to the specified region is executed by an operation of the pointing device.

Meanwhile, in situations in which a computer terminal for image processing is used to display and to edit a three-dimensional medical image obtained by imaging, there is a demand for performing various operations by using only a mouse without using a keyboard. However, the method of switching the region specification processing and the rotation processing with each other by combining the single operation of the drag operation by the left button of the mouse with presence or non-presence of an operation of pressing a shift button on the keyboard does not satisfy the user's demand.

Further, in the method disclosed in Patent Document 1, it is impossible to recognize, by intuition, correspondence between plural regions and functions assigned to the plural regions. Therefore, there has been a problem that the method is hard to use especially for inexperienced users. Further, in processing, such as region specification processing, an arbitrary part of a three-dimensional image needs to be freely specified as needed. In such processing, if functions are assigned to regions divided as illustrated in FIGS. 2 and 3 of Patent Document 1, each of the areas of the regions to which functions are assigned is too small. Therefore, when a desired part of the three-dimensional medical image is not included in a region to which region specification processing is assigned, extra work, such as parallel movement of the three-dimensional medical image or enlargement/reduction of the three-dimensional medical image, is necessary to make a region to which region specification processing is assigned include the desired part of the three-dimensional medical image. Hence, it is impossible to sufficiently reduce the user's work in switching plural kinds of processing with each other.

SUMMARY OF THE INVENTION

In view of the foregoing circumstances, it is an object of the present invention to provide an image processing apparatus, method and program for performing rotation processing and region specification processing on a three-dimensional medical image in such a manner that the two kinds of processing are switched with each other easily by a simple operation that is easy to understand by intuition.

An image processing apparatus of the present invention is an image processing apparatus comprising:

an image obtainment means that obtains a three-dimensional medical image;

a display control means that displays the obtained three-dimensional medical image on a display screen;

an input unit including a pointing device for receiving an input position by a user on the display screen, and an input operation; and an image processing means that performs rotation processing on the displayed three-dimensional medical image based on the received input operation when the received input position is located in a center region of the display screen, and that performs region specification processing on the displayed three-dimensional medical image based on the received input operation when the received input position is located in a region other than the center region of the display screen, wherein the region specification processing specifies a closed curve on the display screen based on the received input operation, and deletes a part of the three-dimensional medical image, and the part being an inside or an outside of a cylinder extending from the specified closed curve toward the depth direction of the display screen.

An image processing method of the present invention is an image processing method comprising:

an image obtainment step for obtaining a three-dimensional medical image;

a display control step for displaying the obtained three-dimensional medical image on a display screen;

an input step for receiving an input position by a user on the display screen, and an input operation by the user; and an image processing step for performing rotation processing on the displayed three-dimensional medical image based on the received input operation when the received input position is located in a center region of the display screen, and performing region specification processing on the displayed three-dimensional medical image based on the received input operation when the received input position is located in a region other than the center region of the display screen, wherein the region specification processing specifies a closed curve on the display screen based on the received input operation, and deletes a part of the three-dimensional medical image, and the part being an inside or an outside of a cylinder extending from the specified closed curve toward the depth direction of the display screen.

An image processing program of the present invention is an image processing program for causing a computer to function as:

an image obtainment means that obtains a three-dimensional medical image;

a display control means that displays the obtained three-dimensional medical image on a display screen;

an input unit including a pointing device for receiving an input position by a user on the display screen, and an input operation by the user; and an image processing means that performs rotation processing on the displayed three-dimensional medical image based on the received input operation when the received input position is located in a center region of the display screen, and that performs region specification processing on the displayed three-dimensional medical image based on the received input operation when the received input position is located in a region other than the center region of the display screen, wherein the region specification processing specifies a closed curve on the display screen based on the received input operation, and deletes a part of the three-dimensional medical image, and the part being an inside or an outside of a cylinder extending from the specified closed curve toward the depth direction of the display screen.

In the present invention, the pointing device may be various kinds of known input equipment, such as a mouse and a touch panel, which can perform an operation for moving a pointer displayed on a display screen. Such input equipment is adoptable as the input unit of the present invention.

In the present invention, the three-dimensional medical image may be represented by medical image data obtained by imaging, for example, by a CT, MRI, ultrasonograph, PET-CT, SPECT, 4D-CT, OCT, X-ray radiographic apparatus (CR, DR), or the like. Alternatively, the three-dimensional medical image may be represented by three-dimensional image data, such as volume data, for example.

Further, a displayed three-dimensional medical image may be represented by using various kinds of known reconstruction method as long as the displayed image represents a three-dimensional medical image. It is desirable that the three-dimensional medical image is a volume rendering image generated by using a volume rendering method, or a pseudo-three-dimensional image, such as a surface rendering image generated by using a surface rendering method.

In the present invention, the center region refers to a region in the vicinity of a center point on a display screen, and the region is concentrated in the center of the display screen. The shape of the center region may be an ellipse, which includes a circle, a rectangle, which includes a square, or other kinds of polygon. Further, the area of the center region may be less than or equal to a fraction of the area of the display screen. The term "a fraction" means that the area is at least smaller than $1/4$ of the area of the display screen, and it is more desirable that the area of the center region is less than $1/9$ of the area of the display screen. For example, the center region may include a center point. Alternatively, the center region may be a doughnut-shaped region surrounding the center point. The size of the center region should be sufficiently large to specify a position on a display screen by a pointing device, but it is desirable that the size of the center region is smaller to maintain a sufficiently large peripheral region (an edge region, which is closer to the edge of the display screen). Further, it is desirable that the center region is, for example, a circle or an ellipse around a center point of the display screen, as a center, and that the area of the center region is less than or equal to $1/9$ of the area of the display screen. It is more desirable that the center region is a circle or an ellipse, the area of which is greater than or equal to $1/300$ of the area of the display screen and less than or equal to $1/10$ of the area of the display screen. It is most desirable that the center region is a circle or an ellipse, the area of which is greater than or equal to $1/300$ of the area of the display screen and less than or equal to $1/18$ of the area of the display screen.

In the present invention, it is desirable that the display control means displays an index for making a user recognize the position of the center region in the center region or in the vicinity of the center region. It is more desirable that the display control means displays the index, the size of which is smaller than the size of the center region, in the center region. It is desirable that such an index makes a user easily recognize the center region, and that the index does not disturb observation of the three-dimensional medical image by the user. For example, it is desirable that the index is displayed semi-transparently, and that the index is not displayed while recognition of the center region is not necessary, for example, while receiving an input position and an input operation. The size of the index should be sufficiently large so that a user can easily recognize the index, but it is desirable that the size of the index is smaller so that the index does not disturb observation of the three-dimensional medical image by the user. For example, the size of the index may be smaller than the size of the center region, and it is desirable that the area of the index is greater than or equal to $1/300$ of the area of the display screen and less than or equal to $1/10$ of the area of the display screen. Further, it is more desirable that the area of the index is greater than or equal to $1/300$ of the area of the display screen and less than or equal to $1/18$ of the area of the display screen. Further, it is still more desirable that the area of the index is greater than or equal to $1/300$ of the area of the display screen and less than or equal to $1/20$ of the area of the display screen.

In the present invention, the region specification processing may specify, based on the received input operation, a closed curve on the display screen also by using an outer edge of the display screen, and delete a part of the three-dimensional medical image, and the part being an inside of a cylinder extending from the specified closed curve toward the depth direction of the display screen.

The three-dimensional medical image in the present invention may include plural organs. The three-dimensional medical image is, for example, a medical image obtained by CT radiography of the chest of a patient, and which includes the heart, the lung, the liver, the stomach, the bone or the like.

An image processing apparatus, method, and program of an image display apparatus according to the present invention receives an input position by a user on a display screen, and an input operation by the user. When the received input position is located in a center region of the display screen, rotation processing is performed on the displayed three-dimensional medical image based on the received input operation. When the received input position is located in a region other than the center region of the display screen, region specification processing is performed on the displayed three-dimensional medical image based on the received input operation. The region specification processing specifies a closed curve on the display screen based on the received input operation, and deletes a part of the three-dimensional medical image, and the part being an inside or an outside of a cylinder extending from the specified closed curve toward the depth direction of the display screen. Therefore, region specification processing is assigned to a peripheral region (an edge region, which is a region closer to the edge) of the display screen, excluding the center region. Further, the area of the peripheral region is sufficiently large, compared with the area of the display screen. Therefore, a user can substantially freely specify a desired part of the three-dimensional medical image by performing a predetermined operation in the peripheral region. Generally, it is presumed that a user observes a three-dimensional image, arranging a region of interest of the user at a center of a display screen. Further, it is presumed that rotating the three-dimensional image around the region of interest of the user matches the intuition of the user. Therefore, an unneeded part, which should be deleted, is seldom located at the center of the display screen in actual cases. Hence, the manner of assignment of functions to regions, as described above, is convenient, and an efficient operation that is appropriate for practical use is possible.

Specifically, since rotation processing is assigned to the center region, it is possible to perform, based on an input operation with respect to the center region, rotation processing on the three-dimensional image, and the three-dimensional image is rotated around the center of the display screen. Therefore, a user can easily recognize, by intuition, correspondence between the region and the processing. Further, region specification processing and rotation processing are automatically switched with each other only by inputting a predetermined operation by using a pointing device at different input positions from each other, i.e., by changing input positions. Therefore, a complex operation of switching these kinds of processing through separate operations is not necessary. Hence, the present invention can satisfy the demand of the user who wants to perform the two kinds of processing on the three-dimensional image by using only the pointing device. Further, it is possible to effectively reduce the work and the operation time of the user.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 2 is a flow chart illustrating a flow of image processing in an embodiment of the present invention;

DESCRIPTION OF THE PREFERRED EMBODIMENTS

Hereinafter, an image processing apparatus, an image processing program and an image processing method according to embodiments of the present invention will be described in detail with reference to drawings. This invention is applicable to various fields in which a desired region is extracted by sequentially deleting an unneeded region in a three-dimensional image displayed on an image display apparatus while a desired image is rotated. Here, the present invention will be described by using a case of applying the present invention to diagnostic imaging in medical fields.

Figure 1:
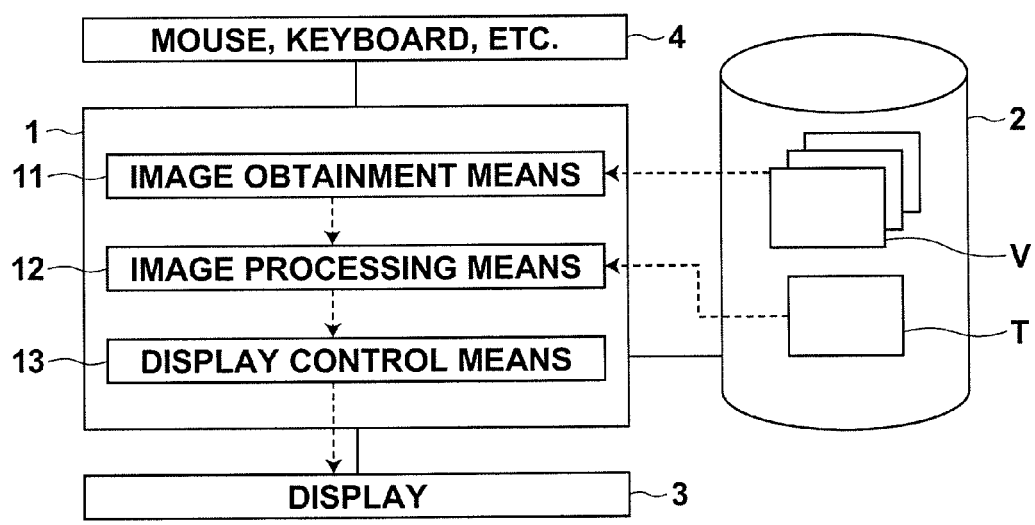
FIG. 1 is a functional block diagram illustrating an image processing apparatus according to an embodiment of the present invention.

FIG. 1 is a schematic diagram illustrating the configuration of an image processing apparatus realized by installing an image display program in a workstation used by doctors. An image processing apparatus 1 includes, as a standard workstation configuration, a processor and a memory (which are not illustrated). Further, the image processing apparatus 1 includes a storage 2, such as HDD (Hard Disk Drive) and SSD (Solid State Drive). Further, a display 3 and an input unit 4, such as a mouse and a keyboard, are connected to the image processing apparatus 1.

An image display program and data referred to by the image display program are stored in the storage 2 when the image display program is installed. The image display program and the data are loaded into the memory at start-up. The image processing program regulates, as processing to be executed by a CPU, image obtainment processing, image processing, and display control processing.

A general-purpose workstation functions, as an image obtainment means 11, a display control means 13, an input unit 4, and an image processing means 12, by causing the CPU to execute the aforementioned processing based on instructions of the program. The image obtainment means 11 obtains a three-dimensional medical image, and the display control means 13 displays the obtained three-dimensional medical image on a display screen. The input unit 4 includes a pointing device for receiving an input position by a user on the display screen, and an input operation by the user. If the received input position is located in a center region 6 of the display screen, the image processing means 12 performs rotation processing on the displayed three-dimensional medical image based on the received input operation. If the received input position is located in a region other than the center region 6 of the display screen, the image processing means 12 performs region specification processing on the displayed three-dimensional medical image based on the received input operation.

The storage 2 stores three-dimensional medical images transferred from an examination department of a hospital or the like, which is in charge of radiography, imaging or the like, or endoscopic images and three-dimensional medical images retrieved from a database. The three-dimensional medical image may be a three-dimensional medical image directly output from a multi-slice CT apparatus, or the like. Alternatively, the three-dimensional medical image may be reconstructed from a group of two-dimensional slice data sets that have been output from a conventional CT apparatus, or the like.

When the image processing apparatus 1 detects selection of a predetermined diagnosis-aid function at a selection menu by a user, the image processing apparatus 1 prompts the user to select or input necessary information to specify a three-dimensional medical image. When the three-dimensional medical image is specified by an operation by the user, the specified three-dimensional medical image is loaded from the storage 2 into the memory.

Here, it is assumed that radiography by a multi-slice CT apparatus has been performed in an examination of a patient, and that three-dimensional medical image V including information about the patient has been obtained, and stored in a database (not illustrated). When a user selects a volume rendering display function, and inputs an identifier of the patient and a date of examination, three-dimensional medical image V corresponding to the identifier of the patient and the date of examination is obtained, and stored in the storage 2. Further, the image processing method of the present invention is performed.

FIG. 2 is a flow chart illustrating a desirable embodiment of the image processing method of the present invention. FIGS. 3A through 3M are diagrams illustrating examples of the display screen during an operation using the image processing method of the present embodiment. In the operation using the image processing method, rotation processing and processing for deleting a specified region are repeated on the three-dimensional medical image V to extract a heart, as a target organ of image-based diagnosis. The heart is extracted from three-dimensional medical image V including the heart, the lung, the liver, ribs, the vertebral column and the like of the patient, and which has been obtained by chest CT radiography on a subject 5. The image processing method of the present invention will be described with reference to FIG. 2 and FIGS. 3A through 3M.

Figure 3A:
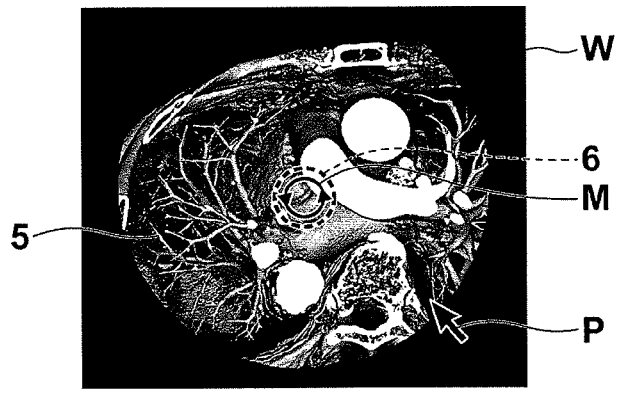
FIG. 3A is a diagram illustrating an example of a display screen in a series of processes for extracting a heart in an embodiment of the present invention (#1)

First, the image obtainment means 11 obtains, from the storage 2, three-dimensional medical image V representing the subject 5 as a target of observation, and which has been obtained by tomography by a CT apparatus (step S01). Before the image processing method of the present invention is performed, the subject 5 represented in the three-dimensional medical image V is moved parallel on a display screen of the display 3 based on a manual operation by a user using the input unit 4. Consequently, a heart that is an organ to be extracted is displayed at a center of a display screen. as illustrated in FIG. 3A. When the user selects a specific mode of rotation processing and region specification processing at a menu, the image processing method of the present invention starts.

First, the display control means 13 displays three-dimensional medical image V representing the subject 5 on display screen W of the display 3 as illustrated in FIG. 3A (step S02). In the present embodiment, the center region 6 is a circular region, and the area of the center region 6 is approximately 1/40 of the area of the display screen W, as illustrated in FIG. 3A. The boundary of the center region 6 is not displayed on the display screen. Instead, center region icon M is displayed in the center region 6 so that the user can recognize an approximate position of the center region 6. The center region icon M is an index, the size of which is smaller than the size of the center region. Here, the size of the center region icon M is approximately 60% of the size of the center region 6.

The input unit 4 waits for an input by the user using a mouse (step S03 is NO). When the input unit 4 detects an input by the user (step S03 is YES), the input unit 4 makes the center region icon M non-displayed (step S04). Further, the input unit 4 receives an input position on the display screen and an input operation by using a known method (step S05). Here, input operations by the user assigned to rotation or region specification processing of a displayed three-dimensional medical image are dragging by the left button of the mouse. Further, the input position is the start position of dragging the mouse. Meanwhile, the method disclosed, for example, in Patent Document 1 is applicable to receipt of the input position and the input operation.

Next, when the received input operation is a drag operation by the left button of the mouse, if the received input position is the center region of the display screen (step S06 is YES), the image processing means 12 performs rotation processing on the displayed three-dimensional medical image based on the received operation (step S07). However, if the received input position is located in a region other than the center region of the display screen (step S06 is NO), the image processing means 12 performs region specification processing on the displayed three-dimensional medical image based on the received input operation (step S08).

Further, when the received input operation is an input operation other than the drag operation by the left button of the mouse, the image processing means 12 executes a predetermined processing function assigned to the received input operation. Further, the image processing apparatus 1 stores, in advance, correspondence table T in the storage 2 in a manner similar to the method disclosed in Patent Document 1. In the correspondence table T, a center region and rotation processing correspond to each other, and a region other than the center region and region specification processing correspond to each other. The image processing means 12 loads the correspondence table T into the memory, and refers to the correspondence table T to perform the aforementioned processing.

Figure 3B:
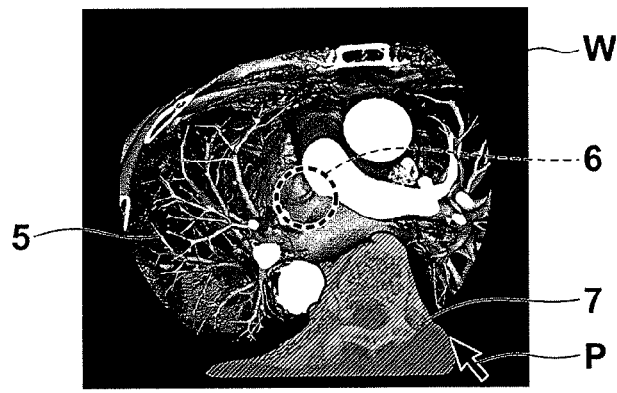
FIG. 3B is a diagram illustrating an example of a display screen in the series of processes for extracting the heart in the embodiment of the present invention (#2)

FIG. 3B is a diagram illustrating a state in which a region 7 to be deleted from FIG. 3A is specified. The region 7 includes vertebral column and rib regions. If the received input position is located in a region other than the center region of the display screen (step S06 is NO), the image processing means 12 specifies a closed curve on display screen W based on the start position of the drag operation by the user using the mouse 4, in which the mouse 4 is dragged in such a manner that pointer P draws the closed curve, and the path of dragging. Further, the image processing means 12 deletes a part of the three-dimensional medical image, and the part being an inside of a cylinder extending from the specified closed curve toward the depth direction of the display screen W. Accordingly, three-dimensional medical image V on which the deletion processing has been performed is generated (step S08). In the present embodiment, a region 7 of the three-dimensional medical image V, and the region belonging to the inside of the cylinder extending from the specified closed curve toward the depth direction of the display screen W, will be referred to as a specified region 7 in some cases. The closed curve may be specified by a polygon composed of sides based on the path of input by the user. Alternatively, the closed curve may be specified by a curve composed of the path of freehand input by the user, or a spline curve based on the path of input by the user. Further, the method for specifying the closed curve may be selected at a selection menu.

In the present embodiment, when the path of the mouse by the drag operation by the user draws a closed curve or a curve beyond the outer edge of the display screen W, as illustrated in FIG. 3B, the image processing means 12 specifies, based on the received input operation, a closed curve on the display screen W also by using the outer edge of the display screen W. Further, the image processing means 12 deletes a part of the three-dimensional medical image, and the part being an inside of a cylinder extending from the specified closed curve toward the depth direction of the display screen W.

Figure 3C:
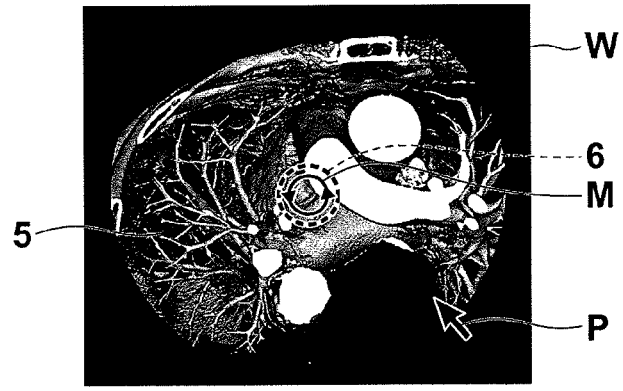
FIG. 3C is a diagram illustrating an example of a display screen in the series of processes for extracting the heart in the embodiment of the present invention (#3)

As illustrated in FIG. 3C, the display control means 13 displays, on the display screen, the three-dimensional medical image V on which specified region deletion processing has been performed. Further, the display control means 13 displays center region icon M on the display screen again (step S09). As illustrated in FIG. 3C, the specified region 7 illustrated in FIG. 3B has been deleted in the displayed three-dimensional medical image V. Since the specific mode of rotation processing and region specification processing continues to be ON (step S10 is NO), the image processing apparatus 1 waits for an input by the user in the state illustrated in FIG. 3C (step S03).

Figure 3D:
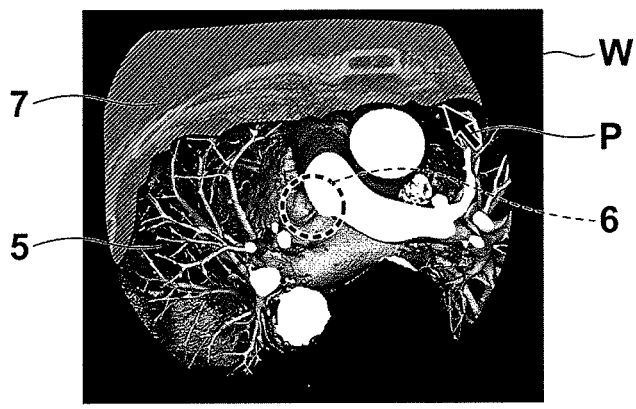
FIG. 3D is a diagram illustrating an example of a display screen in the series of processes for extracting the heart in the embodiment of the present invention (#4)

FIG. 3D is a diagram illustrating a manner of further specifying a region 7 including a rib region to be deleted in the image illustrated in FIG. 3C. Processing is performed in a manner similar to the explanation of FIG. 3B. Specifically, the input unit 4 receives an input by the user, and makes the center region icon M non-displayed. Further, the image processing means 12 specifies a closed curve on display screen W based on the position of the drag operation of pointer P by the user using the mouse 4 and the path of dragging. Further, the image processing means 12 deletes a part of the three-dimensional medical image, and the part being an inside of a cylinder extending from the specified closed curve toward the depth direction of the display screen W. Accordingly, three-dimensional medical image V on which the deletion processing has been performed is generated. Further, the process from step S04 through step S09 is performed to display the generated three-dimensional medical image V and the center region icon M.

Figure 3E:
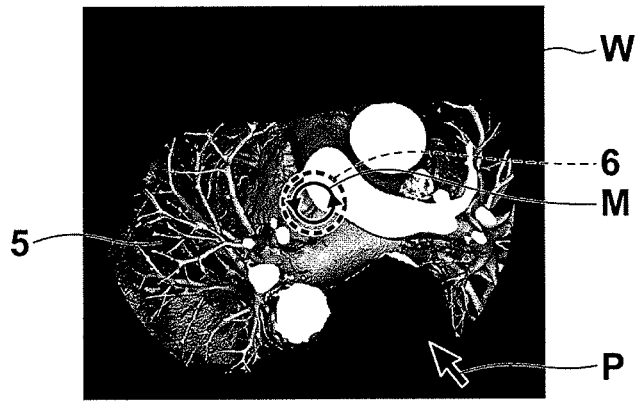
FIG. 3E is a diagram illustrating an example of a display screen in the series of processes for extracting the heart in the embodiment of the present invention (#5)

FIG. 3E is a diagram illustrating an example of a display screen displayed by the display control means 13. In FIG. 3E, the three-dimensional medical image V on which processing for deleting the region specified in FIG. 3D has been performed is displayed on the display screen W, and the center region icon M is displayed again on the display screen W. In FIG. 3E, the specific mode of rotation processing and region specification processing continues to be ON in a manner similar to FIG. 3C (step S10 is NO). Therefore, the image processing apparatus 1 waits for an input by the user with the display state as illustrated in FIG. 3E (step S03).

Figure 3F:
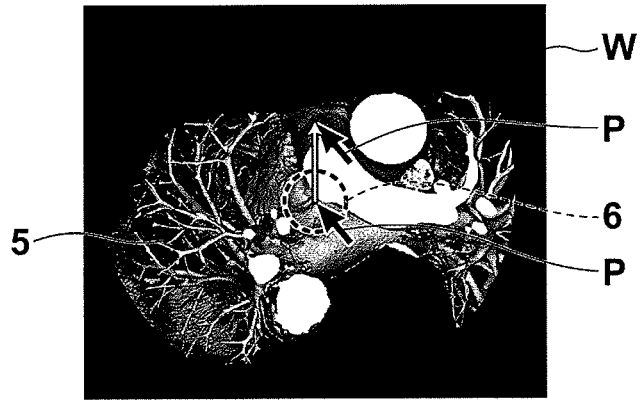
FIG. 3F is a diagram illustrating an example of a display screen in the series of processes for extracting the heart in the embodiment of the present invention (#6)

FIG. 3F is a diagram illustrating a manner in which a drag operation is input in the center region 6 to rotate the displayed three-dimensional medical image V from the state illustrated in FIG. 3E. The processes in Steps S04 and S05 are similar to the region specification processing as described already. The image processing means 12 refers to correspondence table T. When the received input position is located in the center region 6 (step S06 is YES), the image processing means 12 analyzes the received input operation, and calculates a direction from the start point to the end point of the drag operation on the display screen W and the distance of dragging on the display screen W. Further, the image processing means 12 rotates a view point with respect to the three-dimensional medical image V based on the calculated direction and distance, and generates three-dimensional medical image V on which the rotation processing has been performed (step S07).

Here, the user presses the left button of the mouse with pointer P placed at the position of pointer P in the center region 6, which is illustrated on the lower side of FIG. 3F. Further, the user moves the pointer in the direction indicated by a white arrow (toward the upper side of the display screen) with the left button of the mouse pressed, and releases the left button of the mouse at the position of pointer P illustrated on the upper side of FIG. 3F. The image processing means 12 analyzes, based on the received input operation, the input position (a start point of the drag operation), at which the user pressed the left button of the mouse, and the left button release position (an end point of the drag operation). Accordingly, the image processing means 12 calculates the direction of rotation (the direction indicated by the white arrow in FIG. 3F) and the rotation amount. Further, the image processing means 12 rotates the view point with respect to the three-dimensional medical image based on the specified direction and distance. Accordingly, the image processing means 12 generates three-dimensional medical image V on which the rotation processing has been performed.

Figure 3G:
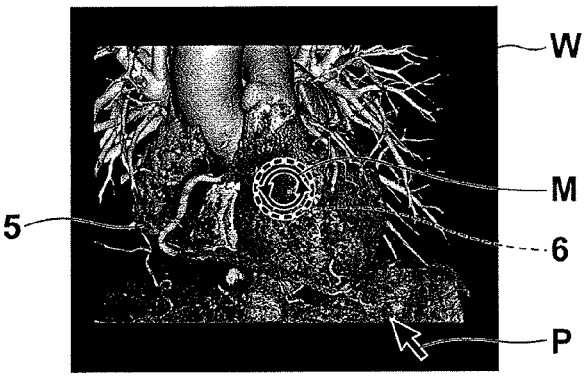
FIG. 3G is a diagram illustrating an example of a display screen in the series of processes for extracting the heart in the embodiment of the present invention (#7)

Further, the display control means 13 displays the generated three-dimensional medical image V, and displays the center region icon M on the display screen again (step S09). FIG. 3G is a diagram illustrating an example of display screen W after rotation processing specified in FIG. 3F has been performed.

Further, the image processing apparatus repeats the process of step S03 through step S09 until the specific mode of rotation processing and region specification processing is turned off by selection of a menu by the user (step S10 is NO).

Figure 3H:
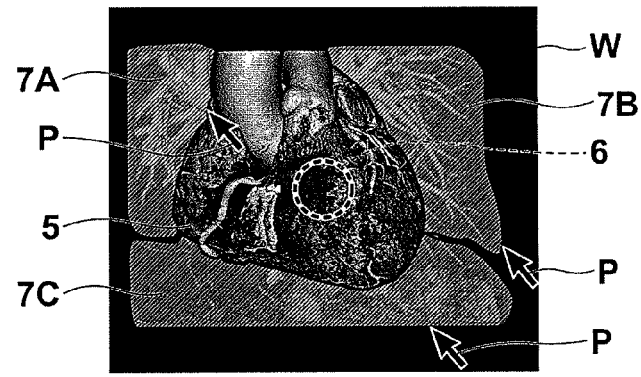
FIG. 3H is a diagram illustrating an example of a display screen in the series of processes for extracting the heart in the embodiment of the present invention (#8)
Figure 3I:
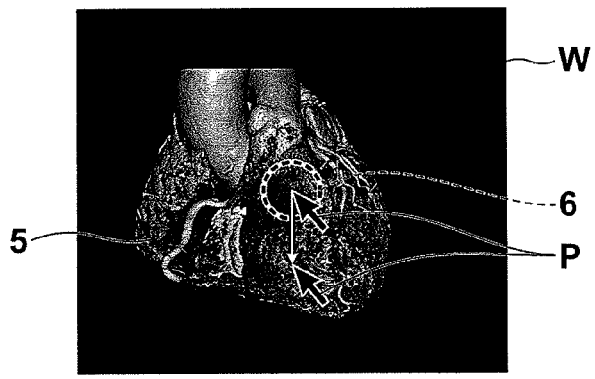
FIG. 3I is a diagram illustrating an example of a display screen in the series of processes for extracting the heart in the embodiment of the present invention (#9)
Figure 3J:
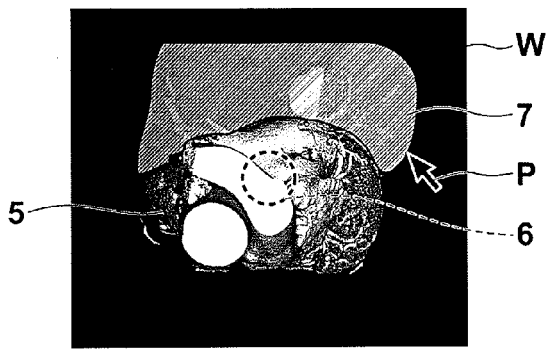
FIG. 3J is a diagram illustrating an example of a display screen in the series of processes for extracting the heart in the embodiment of the present invention (#10)
Figure 3K:
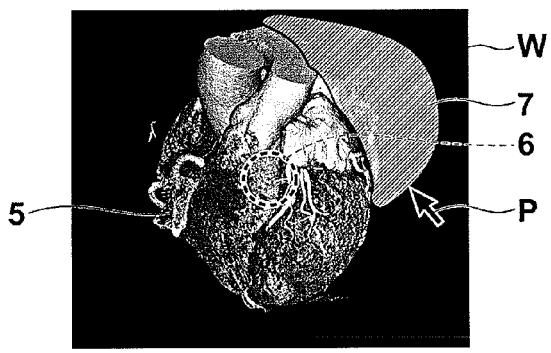
FIG. 3K is a diagram illustrating an example of a display screen in the series of processes for extracting the heart in the embodiment of the present invention (#11)
Figure 3L:
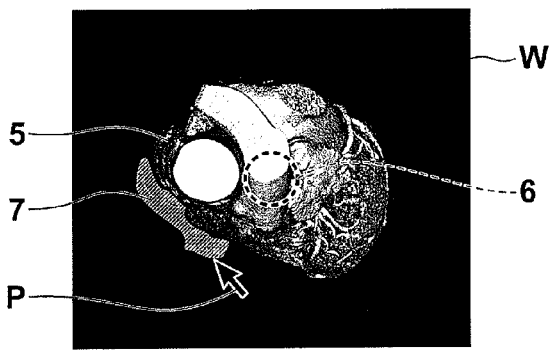
FIG. 3L is a diagram illustrating an example of a display screen in the series of processes for extracting the heart in the embodiment of the present invention (#12)
Figure 3M:
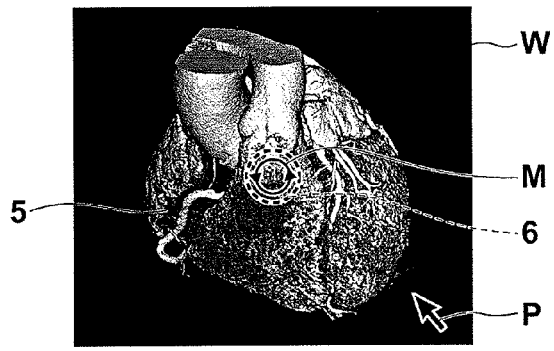
FIG. 3M is a diagram illustrating an example of a display screen in the series of processes for extracting the heart in the embodiment of the present invention (#13).

In the present embodiment, the user appropriately rotates a three-dimensional image to visually identify a region other than a heart, and repeats an operation of deleting the region other than the heart from the three-dimensional image until no region other than the heart remains. Therefore, as illustrated in FIG. 3H, the image processing apparatus 1 sequentially repeats region specification processing based on the input by the user. In the region specification processing, a region or regions (blood vessel regions 7A, 7B of the lung, and liver region 7C) other than the heart are further specified in the three-dimensional medical image V illustrated in FIG. 3G, and deleted. Further, as illustrated in FIGS. 3I through 3L, the image processing apparatus 1 sequentially performs region specification processing on the rotated three-dimensional medical image V, which has been rotated based on an input by the user. In the region specification processing, the image processing apparatus 1 specifies a region 7 other than the heart in the rotated three-dimensional medical image V, and deletes the specified region 7. Finally, the image processing apparatus 1 displays a three-dimensional image including only the extracted heart, as illustrated in FIG. 3M (step S09).

When the user turns off the specific mode of rotation processing and region specification processing of the present embodiment by selection of the menu (step S10 is YES), the image processing of the present embodiment ends, and processing goes back to an ordinary image processing mode.

In the present embodiment, a peripheral region of the display screen, other than the center region 6, corresponds to region specification processing. Further, since the area of the peripheral region is sufficiently large, compared with the area of the display screen, the user can substantially freely specify a desired part of the three-dimensional image by performing a predetermined operation in the peripheral region.

Generally, it is presumed that a user observes a three-dimensional medical image, arranging a region of interest of the user at a center of a display screen. Therefore, rotating the three-dimensional medical image around the region of interest of the user, as the center of rotation, is supposed to match the intuition of the user. Since the rotation processing corresponds to the center region 6 in the present embodiment, it is possible to perform, based on the input operation with respect to the center region, rotation processing on the three-dimensional medical image around the center of the display screen, as the center of rotation. Hence, the user can easily recognize correspondence between the region and the processing by intuition.

Further, the region specification processing and the rotation processing are switchable with each other without a complicated operation for switching the two kinds of processing. The region specification processing and the rotation processing are switchable by performing a predetermined operation by a pointing device only by changing input positions, i.e., at different input positions. Therefore, the present invention can satisfy the demand of users who want to perform the two kinds of processing on the three-dimensional medical image only by the pointing device. Further, the present invention can effectively reduce the work of users and the time of operation by the users. Further, since it is not necessary to use a keyboard, the image processing method of the present invention is appropriately applicable to medical treatment situations in which all kinds of operation at a computer terminal are performed by a mouse to maintain a sufficient space for treatment on an operation table. Therefore, the present invention is widely applicable to various situations in which the method is used.

Further, since the center region icon M, which is an index smaller than the size of the center region, is displayed on the display screen, it is possible to effectively aid a user in recognizing the center region 6, while observation of the three-dimensional medical image V by the user is not prevented by the index. Further, when the index is semi-transparent, even if the index is placed on the three-dimensional medical image V, the three-dimensional medical image V is observable through the semi-transparent index, and that is more appropriate.

In the region specification processing of the present embodiment, a closed curve is specified on a display screen based on a received input operation, and deletes a part of the three-dimensional medical image, and the part being an inside of a cylinder extending from the specified closed curve toward the depth direction of the display screen. Generally, it is presumed that a user observes a three-dimensional medical image, arranging a region of interest of the user at a center of a display screen. Therefore, the closed curve defining the target of deletion by the user is more likely to be present in the peripheral region of the display screen rather than in the center region of the display screen. Hence, the user can specify a part to be deleted from the three-dimensional medical image by performing an operation of specifying the closed curve in the peripheral region. Since an extra operation, such as movement and enlargement of the three-dimensional medical image, is not required to specify the part to be deleted, the deletion operation is simplified. Further, it is not necessary that the part of the three-dimensional medical image deleted in the region specification processing is the inside of the cylinder extending from the closed curve specified by the input operation toward the depth direction of the display screen. Alternatively, the region specification processing may delete the outside of the cylinder extending from the closed curve specified by the input operation toward the depth direction of the display screen. In such a case, the closed curve defining the target of deletion by the user is specified in the peripheral region in such a manner to surround the center region 6. When the closed curve is specified in such a manner, it is possible to specify the part to be deleted in the three-dimensional medical image without requiring an extra operation, such as movement and enlargement of the three-dimensional medical image. The region specification processing may have an option for setting, in advance, whether an inside or an outside of the cylinder is deleted. In the present embodiment, it is assumed that the inside of the cylinder is set as a region to be deleted. Further, when a closed curve is specified and a part of a three-dimensional medical image is deleted as in the present embodiment, it is needless to say that the three-dimensional medical image may be still moved or enlarged, if necessary.

Further, the region specification processing of the present embodiment may be processing that does not delete the specified region. The region specification processing may specify, based on the received input operation, a closed curve on a display screen, and specify the inside of the cylinder extending from the specified closed curve toward the depth direction of the display screen. In such a case, a drag operation for specifying a region may be performed, and a dialog or the like may be displayed at the position of the mouse pointer (position at which the button of the mouse is released) at which the drag operation has been completed. The dialog or the like may make it possible for the user to select deletion of a specified region (deletion of the inside of the specified region) or selection of the specified region (deletion of the outside of the specified region). In this manner, the user may select a region to be deleted.

In the present embodiment, when the path of the mouse by the drag operation by the user draws a closed curve or a curve beyond the outer edge of the display screen W, the region specification processing by the image processing means 12 specifies, based on the received input operation, a closed curve on the display screen also by using the outer edge of the display screen. Further, a part of the three-dimensional medical image, and the part being an inside of a cylinder extending from the specified closed curve toward the depth direction of the display screen, is deleted. Therefore, the user does not need to be conscious of the outer edge of the display screen W to perform a manual operation for specifying a region, and the image processing method of the present embodiment is user friendly.

Further, when the image processing method of the present embodiment is applied to extraction of a desired region from three-dimensional medical image V including plural organs, the aforementioned effects of the image processing of the present invention are extremely advantageous in medical fields which need to perform many operations to extract different regions from patients.

For example, in the aforementioned embodiment, a series of processing for extracting the heart from the three-dimensional medical image is a combination of two kinds of processing, namely, at least eight times of region specification processing, in which a region is specified and deleted, and at least five times of rotation processing. When a more complicatedly shaped region is extracted from the three-dimensional medical image, more operations by the user are generally expected to be required in switching the two kinds of processing with each other. However, in the image processing method of the present embodiment, at least 13 times of processing, namely, at least eight times of region specification processing, in which a region is specified and deleted, and at least five times of rotation processing can be performed based on at least 13 times of input only by one operation by the user. Meanwhile, when image processing is performed by a combination of an input operation by a mouse, and presence or non-presence of a predetermined operation of a keyboard, an operation of switching the predetermined operation at the keyboard is necessary in addition to the operation by the user in the present embodiment. Further, as in Patent Document 1, when rotation processing is not assigned to a region that is especially appropriate for the rotation processing, and the ratio of the region to which the rotation processing is assigned is not appropriate, an extra operation of moving the three-dimensional medical image V to a region of the display screen to which region specification processing has been assigned is necessary in addition to the operation by the user in the present embodiment. In contrast, the image processing method of the present embodiment makes it possible for the user to recognize his/her operation by intuition. Further, the number of times of operation by the user is minimized. Hence, the image processing method of the present embodiment can achieve extremely advantageous effect for the user by greatly reducing the work by the user and the time of operation by the user.

Next, a modified example of the present embodiment will be described.

The display control means 13 of the aforementioned embodiment may automatically enlarge or reduce the size of the three-dimensional medical image so that the volume or the display area of the three-dimensional medical image becomes approximately 80% of the display screen. In such a case, if the user performs a drag operation only for rotation processing or region specification processing on the three-dimensional medical image, the three-dimensional medical image is automatically displayed in an exact size that is appropriate for the operation by the user, such as rotation, region specification and the like. Therefore, the user does not need to perform an operation for enlarging a three-dimensional image, the size of which has been reduced by deletion in the region specification processing. In other words, it is possible to extract a desired region easily and quickly without an extra operation other than the drag operation for rotation processing or region specification processing on the three-dimensional medical image.

In the aforementioned embodiment, the image processing apparatus 1 may further include a region-of-interest movement means. The region-of-interest movement means extracts a center of a three-dimensional medical image (for example, the center of gravity of the three-dimensional medical image) as a region of interest. Further, the region-of-interest movement means moves the extracted region of interest to a central area of the display screen, and displays the region of interest in the central area of the display screen. Alternatively, the image processing apparatus 1 may further include a region-of-interest extraction means that automatically extracts a structure, such as an organ or a lesion, included in the three-dimensional image. Further, the image processing apparatus 1 may include a region-of-interest movement means that moves the extracted region of interest to a central area of the display screen, and displays the region of interest in the central area of the display screen. When the image processing apparatus 1 is configured in such a manner, it is possible to perform the image processing of the present invention on a projection image in which the region of interest of the three-dimensional medical image is automatically arranged in a central area of the display screen. Therefore, if a user merely performs a drag operation just for rotation processing and region specification processing on the three-dimensional medical image, it is possible to display the region of interest in the central area of the display screen, and to automatically determine a center of rotation in the region of interest or in the vicinity of the region of interest. Hence, it is possible to extract a desired region easily and quickly without an extra operation other than the drag operation for rotation processing and region specification processing on the three-dimensional medical image. Further, it is possible to place the region of interest in a central area, and easy recognition of a subject by intuition is possible.

As the region-of-interest extraction means, for example, the following techniques are adoptable.

For example, as extraction techniques by computer aided diagnosis (CAD), techniques disclosed in Japanese Unexamined Patent Publication No. 2001-137230 and Japanese Unexamined Patent Publication No. 2008-253293 are applicable to extraction of a lung field. Further, techniques disclosed in Japanese Unexamined Patent Publication No. 2001-283191 and U.S. Patent Application Publication No. 20020181754 are applicable to extraction of a liver. Further, a technique disclosed in Japanese Unexamined Patent Publication No. 2008-043564 is applicable to extraction of a bone, and a technique disclosed in Japanese Unexamined Patent Publication No. 2004-141612 is applicable to extraction of a heart. Further, other organ recognition techniques are applicable as long as the techniques can automatically extract an organ to which the position of a specified lesion belongs.

Further, a structure extracted from a three-dimensional image may be a lesion, such as an abnormal shadow in a medical image. The abnormal shadow may be manually extracted. Alternatively, the abnormal shadow may be automatically extracted by performing computer aided diagnosis (CAD) that can automatically detect an abnormal shadow candidate by computer processing.

Specific techniques applicable to detection of a lesion region are disclosed, for example, in U.S. Patent Application Publication No. 20030095692, and in Japanese Unexamined Patent Publication No. 2003-271924. Further, a technique for detecting a lung cancer disclosed in K. Kubota et al., "Evaluation of Computer-Aided Diagnosis system for Lung Cancer based on Helical CT images", the Institute of Electronics, Information and Communication Engineers (IEICE), IEICE Technical Report, pp. 41-46, 2001 is applicable. Further, consolidation disclosed in S. Kido et al., "Intelligent CAD for diffuse lung diseases", Grant-in-Aid for Scientific Research, granted by the Ministry of Education, Culture, Sports, Science and Technology (MEXT), Study in Specific Field "Intellectual Diagnosis Aid of Multi-Dimensional Medical Image", Proceedings of 4th Symposium, pp. 45-54, 2007 is applicable. Further, Ground-Glass Opacity (GGO) and Crazy-Paving are applicable. Further, detection techniques of diffuse lung disease, such as honeycomb-shaped shadow, pulmonary emphysema shadow and particle-shaped shadow, are applicable. Further, a technique for detecting a liver cancer disclosed in Y. Wakida et al., "Liver Cancer Detection based on a Temporal Density Feature from Abdominal Dynamic X-ray CT Images", Journal of Computer Aided Diagnosis of Medical Images, Vol. 10, No. 1, pp. 1-10, 2007 is applicable. Further, a technique for detecting bleeding in hepatocellular carcinoma, hepatic cyst, hepatic hemangioma, and a liver region, and bleeding in a brain region disclosed in H. Fujita et al., "Intelligent Computer-aided Diagnosis Based on Normal Structure Recognition of Human Body", Grant-in-Aid for Scientific Research, granted by the Ministry of Education, Culture, Sports, Science and Technology (MEXT), Study in Specific Field "Intellectual Diagnosis Aid of Multi-Dimensional Medical Image", Proceedings of 4th Symposium, pp. 55-60, 2007 is applicable. Further, a technique for detecting an abnormal blood vessel, as disclosed in U.S. Patent Application Publication No. 20050010100, a technique for detecting an abnormal shadow candidate, as disclosed in U.S. Pat. No. 5,940,527, which was filed by FUJIFILM Corporation, and a technique for detecting a calcification region as disclosed in Japanese Unexamined Patent Publication No. 8(1996)-215183 are applicable.

In the aforementioned embodiments, the term "center region" refers to a region in the vicinity of a center point of a display screen, which is concentrated at a central area of the display screen. The center region may be an ellipse, which includes a circle, a rectangle, which includes a square, or other kinds of polygon. Further, the area of the center region may be less than or equal to a fraction of the area of the display screen. The term "a fraction" means that the area is at least smaller than $1/4$ of the area of the display screen, and it is more desirable that the area of the center region is less than $1/6$ of the area of the display screen. For example, the center region may include a center point. Alternatively, the center region may be a doughnut-shaped region surrounding the center point. The size of the center region should be sufficiently large to specify a position in the central region on a display screen by a pointing device, but it is desirable that the size of the center region is smaller to maintain a sufficiently large peripheral region. Further, it is desirable that the center region is, for example, a circle or an ellipse around a center point of the display screen, as a center, and that the area of the center region is less than or equal to $1/6$ of the area of the display screen. It is more desirable that the center region is a circle or an ellipse, the area of which is greater than or equal to $1/300$ of the area of the display screen and less than or equal to $1/10$ of the area of the display screen. It is most desirable that the center region is a circle or an ellipse, the area of which is greater than or equal to $1/300$ of the area of the display screen and less than or equal to $1/18$ of the area of the display screen. Further, it is desirable that the user can set the center region in various sizes based on the size of the display or the like and convenience of operations by the user. Instead of determining the size of the center region in relation with the display screen, the center region may be set in such a manner that the center region is displayed in a desirable display size on the display screen. For example, it is desirable that the center region is set so as to be displayed as a circle having a diameter of approximately 0.5 cm through 5 cm (or an area defined by a closed curve, and the size of which is about the same as the size of this circle). It is more desirable that the center region is set so as to be displayed as a circle having a diameter of approximately 0.7 cm through 3 cm (or an area defined by a closed curve, and the size of which is about the same as the size of this circle). Further, it is still more desirable the center region is set so as to be displayed as a circle having a diameter of approximately 1 cm through 2 cm (or an area defined by a closed curve, and the size of which is about the same as the size of this circle).

The index should maintain a sufficiently large size so that the user can easily identify the index, but it is desirable that the size of the index is smaller so as not to disturb observation of a three-dimensional medical image by the user. For example, the size of the index should be smaller than the size of the center region. It is desirable that the area of the index is greater than or equal to $1/300$ of the area of the display screen and less than or equal to $1/10$ of the area of the display screen, for example. Further, it is more desirable that the area of the index is greater than or equal to $1/300$ of the area of the display screen and less than or equal to $1/18$ of the area of the display screen. Further, it is still more desirable that the area of the index is greater than or equal to $1/300$ of the area of the display screen and less than or equal to $1/20$ of the area of the display screen. Further, it is desirable that the user can set the center region icon in various sizes based on the size of the display or the like and convenience of operations by the user. Instead of determining the size of the center region icon in relation with the display screen, the center region icon may be set so as to be displayed in a desirable display size on the display screen. For example, the size of the center region icon should be smaller than the size of the center region. It is desirable that the center region icon is set so that the size of the center region icon is about the same as the size of a circle having a diameter of approximately 0.5 cm through 5 cm. It is more desirable that the center region icon is set so that the size of the center region icon is about the same as the size of a circle having a diameter of approximately 0.7 cm through 3 cm. Further, it is still more desirable that the center region icon is set so that the size of the center region icon is about the same as the size of a circle having a diameter of approximately 1 cm through 2 cm.

Each of the aforementioned embodiments was described only as an example. Therefore, none of the descriptions should be used and construed to restrict the technical scope of the present invention.

Further, various modifications to the system configuration, the hardware configuration, the process flow, the module configuration, user interface, specific processing content, and the like are possible without departing from the gist of the present invention. Such modifications are still within the technical scope of the present invention.

The three-dimensional image may be obtained by tomography or the like, and formed. Alternatively, the three-dimensional image may be virtually generated by CG (computer graphics). Further, the subject may be anything as long as the subject is represented in the three-dimensional image. For example, the subject may be a human body, an animal, a plant, a geometric figure, a structure, such as a building and a machine, a landform, such as a relief map, and the like. Further, the modality used in tomography may be a CT, MRI, ultrasonograph, or the like as long as a three-dimensional image is obtainable.

Further, the image processing apparatus 1 may be configured by plural computers, and functions as the means may be distributed to the plural computers. Further, any known apparatus is adoptable as an input unit, a display and the like, which constitute the system. For example, a joystick may be used instead of the mouse, and a touch panel may be used instead of the display.

What is claimed is:

1. An image processing apparatus comprising:
    a receiver that obtains a three-dimensional medical image;
    a display controller that displays the three-dimensional medical image on a display screen by projecting from a view point;
    an input interface comprising a pointing device for receiving an input position by a user on the display screen, and an input operation of a dragged path from the input position as a start point by the user;
    a processor that extracts an image of an organ from the displayed three-dimensional medical image by:
        automatically determining a center region of the three-dimensional medical image, wherein the center region is an area in a middle of the three-dimensional medical image,
        displaying the three-dimensional medical image with a center region index inside the center region, wherein the center region is displayed in the three-dimensional medical image without a boundary,
        determining the input position received from the user interface,
        in response to the processor determining that the input position is in the center region of the three-dimensional medical image, the processor performs rotation processing which rotates the view point for projecting the three-dimensional medical image on the display screen on the displayed three-dimensional medical image based on the received input operation,
        in response to the processor determining that the input position is outside the center region of the three-dimensional medical image, the processor performs region specification processing on the displayed three-dimensional medical image, wherein the region specification processing specifies a closed curve that is formed by the dragged path on the display screen, and deletes an entire part of the three-dimensional medical image, which is an inside or an outside of a cylinder extending from the specified closed curve toward the depth direction of the display screen,
    wherein the processor, after displaying the three-dimensional medical image obtained by the receiver, repeats performing the rotation processing and the region specification processing by using the display controller in response to receiving the input position and the input operation of the path by the input interface and re-displaying the three-dimensional medical image, in a modified state, after each of the rotation processing and the specification processing, and
    extracts the image of the organ from the three-dimensional medical image based on the repeated rotation processing and the region specification processing until regions other than the organ in the three dimensional image are deleted,
    wherein a center of rotation is determined automatically in a region of interest or in a vicinity of the region of interest,
    wherein the center region index is a semi-transparent index, and
    wherein, in response to receiving the input position via the input interface, the semi-transparent index disappears from the display and in response to performing one of the rotation processing and the region specification processing, redisplaying the three-dimensional medical image in a modified state with the semi-transparent index.

2. An image processing apparatus, as defined in claim 1, wherein an area of the center region is less than or equal to ⅛ of the area of the display screen.

3. An image processing apparatus, as defined in claim 1, wherein the region specification processing specifies, based on the received input operation, the closed curve on the display screen also by using an outer edge of the display screen, and deletes the entire part of the three-dimensional medical image, and the entire part being an inside of a cylinder extending from the specified closed curve toward the depth direction of the display screen such that after the rotation processing the entire part is not displayed in the three-dimensional image.

4. An image processing apparatus, as defined in claim 1, wherein an area of the center region is greater than or equal to 1/300 of the area of the display screen and less than or equal to 1/20 of the area of the display screen.

5. An image processing apparatus, as defined in claim 1, wherein the three-dimensional medical image includes a plurality of organs and wherein the extracting comprises extracting the organ from among the plurality of organs and deleting other organs from among the plurality of organs.

6. An image processing apparatus, as defined in claim 1, wherein the display controller automatically enlarges or reduces a size of the three-dimensional medical image so that a volume or a display area of the three-dimensional medical image becomes approximately 80% of the display screen.

7. The image processing apparatus, as defined in claim 1, wherein:
    the region specification processing is performed on a peripheral region of the display screen,
    the closed curve defines a target of deletion, and
    the depth is determined based on the closed curve.

8. The image processing apparatus, as defined in claim 1, wherein size of a center region icon is approximately sixty percent of the size of the center region.

9. The image processing apparatus, as defined in claim 1, wherein the processor is configured to delete the entire part which is the outside of the cylinder specified by the closed curve and wherein the closed curve surrounds the center region.

10. The image processing apparatus, as defined in claim 1, wherein the processor is further configured to select the outside or the inside of the cylinder for the deleting based on a preset configuration.

11. The image processing apparatus, as defined in claim 1, wherein the processor determines that the extracting of the organ is to be performed based on a user input received from the input interface.

12. The image processing apparatus, as defined in claim 11, wherein in the extracting of the organ performed by the processor, the user input is received without a keyboard.

13. The image processing apparatus, as defined in claim 11, wherein in the extracting of the organ performed by the processor, the user input is received only via the pointing device.

14. The image processing apparatus, as defined in claim 1, wherein distance and direction of the rotation processing is determined based on the input operation received via the input interface.

15. The image processing apparatus, as defined in claim 1, wherein in response to receiving the input operation from the input interface, the processor displays a dialogue in which a selection of deleting one of the inside of the cylinder and the outside of the cylinder is made.

16. An image processing method comprising:
   an image obtainment step for obtaining a three-dimensional medical image;
   a display control step for displaying the three-dimensional medical image on a display screen by projecting from a view point;
   an input step for receiving an input position by a user on the display screen, and an input operation of a dragged path from the input position as a start point by the user;
   extracting an image of an organ from the displayed three-dimensional medical image by:
      automatically determining a center region of the three-dimensional medical image, wherein the center region is an area in a middle of the three-dimensional medical image,
      displaying the three-dimensional medical image with a center region index inside the center region, wherein the center region is displayed in the three-dimensional medical image without a boundary,
      determining the input position received from the user interface,
      in response to the determining that the input position is inside the center region of the three-dimensional medical image, performing rotation processing which rotates the view point for projecting the three-dimensional medical image on the display screen on the displayed three-dimensional medical image, and
      performing region specification processing on the displayed three-dimensional medical image in which a closed curve is formed by a dragged path operation input by a user on the display screen, and an entire part of the three-dimensional medical image, which is an inside or an outside of a cylinder extending from the specified closed curve is deleted toward the depth direction of the display screen;
   re-displaying the three-dimensional medical image, in a modified state, after each of the rotation processing and the specification processing, and
   a repeat control step that, after displaying the three-dimensional medical image obtained by the image obtainment unit, repeats performing extracting the organ from the three-dimensional medical image by repeatedly performing the rotation processing and the region specification processing until regions other than the organ in the three dimensional image are deleted;
   wherein a center of rotation is determined automatically in a region of interest or in a vicinity of the region of interest,
   wherein the center region index is a semi-transparent index, and
   wherein, in response to receiving the input position via the input interface, the semi-transparent index disappears from the display and in response to performing one of the rotation processing and the region specification processing, redisplaying the three-dimensional medical image in a modified state with the semi-transparent index.

17. A non-transitory computer-readable recording medium storing therein an image processing program for causing a computer to execute the following operations:
   an image obtainment unit that obtains obtain a three-dimensional medical image;
   a display control unit that displays display the three-dimensional medical image on a display screen by projecting from a view point;
   an input unit including receive an input position input by a user on the display screen via a pointing device, and an input operation of a dragged path from the input position as a start point via the pointing device by the user;
   extracts an image of an organ from the displayed three-dimensional medical image by:
      automatically determining a center region of the three-dimensional medical image, wherein the center region is an area in a middle of the three-dimensional medical image,
      displaying, on the display screen, the three-dimensional medical image with a center region index inside the center region, wherein the center region is displayed in the three-dimensional medical image without a boundary,
      determining the input position received from the user interface,
   an image processing unit that in response to the determining that the input position is in the center region of the three-dimensional medical image, performing rotation processing which rotates the view point for projecting the three-dimensional medical image on the display screen on the displayed three-dimensional medical image
   region specification processing on the displayed three-dimensional medical image based on the received input operation, wherein the region specification processing specifies a closed curve that is formed by a dragged path on the display screen, and deletes an entire part of the three-dimensional medical image, which is an inside or an outside of a cylinder extending from the specified closed curve toward the depth direction of the display screen,
   redisplaying the three-dimensional medical image, in a modified state, after each of the region specification processing and the rotation processing, and
   extracting the image of the organ from the three-dimensional medical image based on repeatedly executing the rotation processing and the region specification processing until regions other than the organ in the three dimensional image are deleted, wherein a center of rotation is determined automatically in a region of interest or in a vicinity of the region of interest, wherein the center region index is a semi-transparent index, and wherein, in response to receiving the input position via the input interface, the semi-transparent index disappears from the display and in response to performing one of the rotation processing and the region specification processing, redisplaying the three-dimensional medical image in a modified state with the semi-transparent index.

* * * * *